March 18, 1969     L. M. O. CYMBALISTY     3,433,245
DISCHARGE VALVE PULSATOR SYSTEM
Filed April 28, 1967
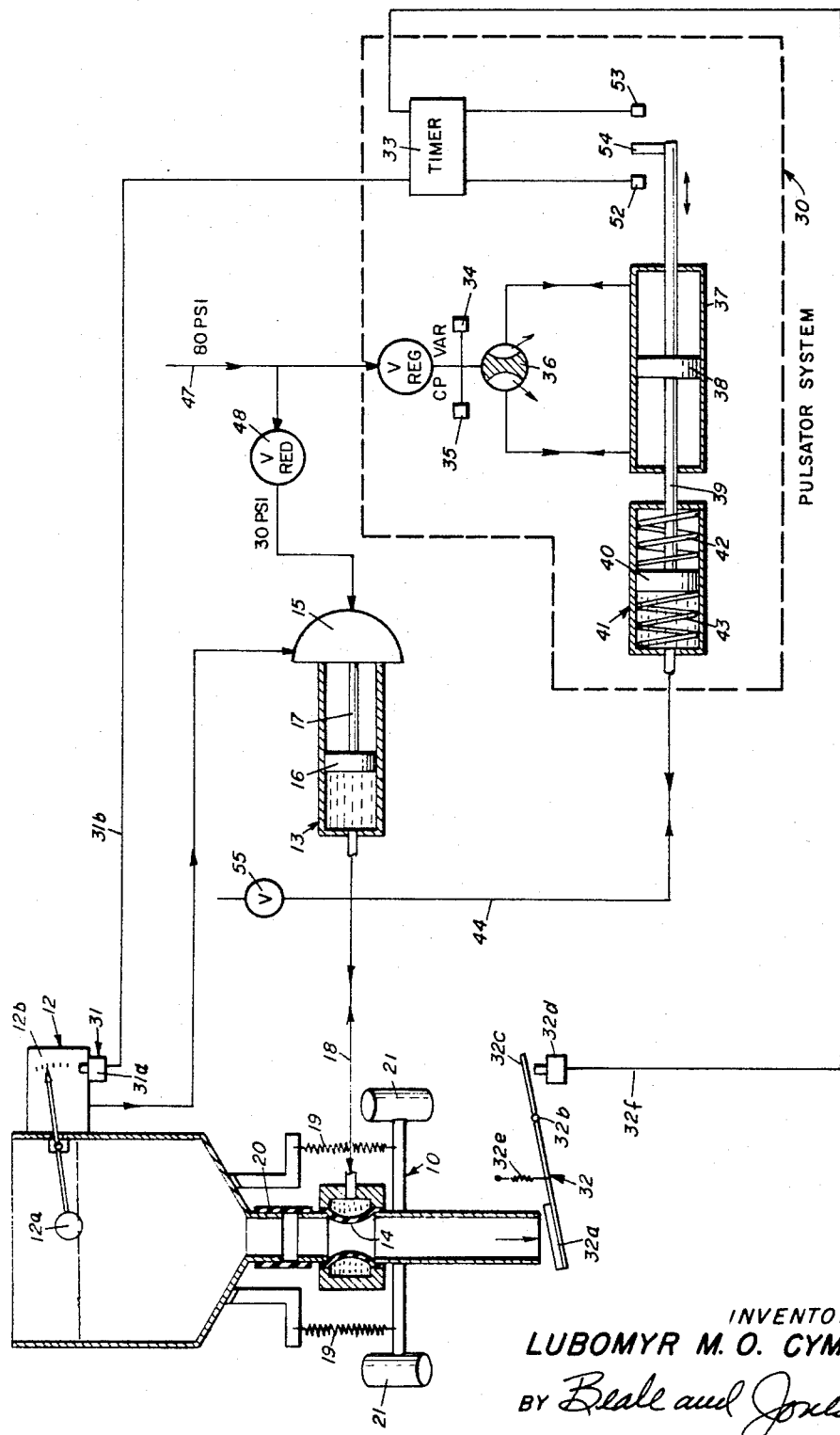
INVENTOR
LUBOMYR M. O. CYMBALISTY
BY Beale and Jones
ATTORNEYS

United States Patent Office 3,433,245
Patented Mar. 18, 1969

3,433,245
DISCHARGE VALVE PULSATOR SYSTEM
Lubomyr M. O. Cymbalisty, Edmonton, Alberta, Canada, assignor of thirty percent to Cities Service Athabasca, Inc., a corporation of Delaware, thirty percent to Imperial Oil Limited, a corporation of Canada, thirty percent to Atlantic Richfield Corporation, a corporation of Pennsylvania, and ten percent to Royalite Oil Company, Limited, a corporation of Canada
Filed Apr. 28, 1967, Ser. No. 634,680
U.S. Cl. 137—242     16 Claims
Int. Cl. F16k 31/18

ABSTRACT OF THE DISCLOSURE

A pneumatic, hydraulic or other means for developing selectively variable pressure pulsations and superposing them on the hydraulic control system for the resilient discharge orifice of a variable throat restrictor valve for the purpose of restoring normal flow through the valve when a clogged condition of the valve is sensed.

Background of the invention

In chemical processes generally and in petroleum refining particularly, the handling of fluid suspended particulate matter has gained extensive use in recent years. In such systems it has become common practice to employ pressure controlled resilient variable throat restrictor valves for various purposes, the most important being to serve as a flow regulating means. Frequently in these systems there are oversize solids present. Also, the nature of the particulate matter and the handling processes are often such that there is an inherent tendency of the solids to compact and clog the system at the restrictor valves. The use of various forms of vibratory flow inducing means have been unsuccessful in clearing the valves under all circumstances.

In some instances momentary constriction of the throat will compress the compact mass and either break it up or reduce the size sufficiently to pass through the valve while in others a momentary enlargement of the throat may be necessary to pass an extraneous solid mass.

Summary of the invention

The present invention relates to the flow of fluid mixture systems and specifically detects the stoppage of flow in the system by an in stream flow detecting means in the discharge stream from a container, or detects an overfilled condition of the container when a reduced flow occurs that is not automatically maintained by the normal flow controlling means in the system. Selectively variable pressure pulsations are then produced and superposed on the hydraulic control system for the resilient discharge orifice of a variable throat restrictor valve to cause the resilient orifice to contract and expand and thereby break up a clogging mass of material or pass through larger noncompressible objects. Pulsations may be selectively produced to vary from a minimum constriction or expansion of the variable throat orifice to a maximum of either, or any cyclic combination of the two.

Description of the drawings

In the drawing, there is illustrated diagrammatically one embodiment of a system in which the present invention is practiced.

Description of the invention

The drawing shows in schematic form a portion of a system for handling particulate matter in a flowable or fluidized condition wherein a variable throat restrictor valve 10 is used to regulate the flow of material from the hopper or container 11 being continuously supplied with the fluid mixture by a means not shown. Valve 10 and its associated control and flow regulating components can be any one of several conventional designs that are well known in the trade and need not be described in specific detail. By way of illustration the basic requirements are a level or flow sensing means 12 to develop and transmit appropriate control signals responsive to the level of material in the container and a valve positioner assembly 13 to convert such signals into correlated hydraulic fluid movement that is applied to the valve throat chamber 14 to vary the valve throat cross sectional area inversely with the level changes. Typically the level sensing means 12 is a float type unit developing pressure signals to control the pilot valves of an Annin valve unit 15. This unit is connected to a piston 16 by rod 17 and forces hydraulic fluid into and out of the valve throat chamber 14 through the connecting closed hydraulic system 18.

Valve 10 is resiliently mounted as indicated by springs 19 flexibly connected to container 11 by a rubber sleeve 20. In normal operation valve 10 is continuously vibrated by a conventional eccentric mechanism 21.

This vibration of valve 10 is effective in maintaining a steady flow unless a foreign object or an excessively large compact mass of the particulate materials becomes lodged in the throat. These problems are particularly troublesome in systems extracting oil from oil bearing shales and sands. The present invention overcomes these problems by superposing adjustably variable pulsations on the throat with the pulsator system 30.

The preferred pulsator arrangement is shown in the diagram as a pneumatic system. A timer unit 33 controlling its operation is energized by means of an in stream flow sensing unit 32 or an excessive high level sensor unit 31 that may be included as a part of the level sensing means 12. In a most elementary form the flow sensing unit 32 consists of an arm having one end 32a interposed in the discharge stream from valve 10, pivoted at 32b, and its opposite end 32c actuating microswitch 32d. When flow stops for any reason deflection of arm end 32a by the force of the moving material will cease and spring 32e will move arm end 32c into engagement with microswitch 32d and close its normally open contact points to energize time 33 through circuit 32f. When flow through valve 10 is reduced but not entirely cut off by a partial stoppage, the in stream flow sensing unit 32 may not energize the timer 33 and the mixture in container 11 will continue to rise. Float 12a will move upwardly until the float arm 12b engages a microswitch 31a, closing its normally open contacts and energizing timer 33 through circuit 31b. One or both of the timer circuits 31b and 32f may also energize a remote warning device such as a light or bell, not shown.

Timer unit 33 alternately energizes solenoids 34 and 35 of the double solenoid normally closed distribution valve 36 alternately admitting compressed air to each end of air cylinder 37 causing actuator piston 38 to reciprocate. Reciprocation of piston 38 is transmitted through a connecting rod 39 to a pulsator piston 40 in hydraulic cylinder 41, balanced in a neutral position by compression springs 42 and 43. Movement of piston 40 alternately adds and withdraws hydraulic fluid from system 18 through line 44 thereby super-imposing alternately increased or positive and decreased or negative pressure pulsations in hydraulic system 18. Axial movement of the interconnected pistons 38 and 40 is controlled by adjustable stop devices 52 and 53 that release distribution valve 36 by the timer unit 33 to its neutral position when follower arm 54 engages either stop. Operating high pressure air is supplied by air line 47 and reduced by valve 48 for operation of Annin valve 15 and also reduced by a variable regulating valve 49 to supply a controlled pressure to distribtuion valve 36.

The hydraulic system 18 is charged through valve 55 with a sufficient quantity of hydraulic fluid to maintain the throat of valve 10 sufficiently constricted when maximum flow is called for so that further enlargement of the throat can be obtained when the pulsator system is actuated. The pressure in hydraulic system 18 is relatively low in relation to the opposed forces developed in the valve positioning assembly 13 so that substantial pressure pulsations can be developed in the pulsator system without adversely affecting the normal operation of the flow regulating system, springs 42 and 43, on the other hand, are only sufficiently strong to maintain piston 40 in a neutral or substantially mid-position against the low pressure in system 18 and to return the piston to such a position upon release of air pressure in either end of air cylinder 37.

Timer 33 controls the frequency of pulsations, which varies according to the size of the variable throat valve 10 and the material involved. For tar sand applications and a one-inch throat valve at least five cycles per minute are required for effective operation while normally about 20 cycles per minute are required for most effective operation.

Amplitude of the pulsations is varied by positioning the adjustable stop devices 52 and 53. Amplitude is almost completely variable from a minimum positive or negative pulse to a maximum of either or any combination of the two. A positive pulse increases the pressure in throat chamber 14 constricting the throat while a negative pulse reduces the pressure in the throat chamber and expands the throat. In normal operation with compacted tar sands medium and essentially equal positive and negative pulses break the clogging mass up on positive pulses and then pass them on through on negative pulses. When solid particles are present and particularly so when they may contain sharp edges it may be desirable to operate with maximum negative pulse amplitude and little or no positive pulse amplitude tot reduce wear on the valve throat and pass particles of maximum size.

It is readily apparent that various changes in design and component arrangements can be made and remain within the scope of the invention. The preferred embodiment is explained in detail in way of illustration of an operable system, it being understood that the same functions can be obtained with equivalent means. For instance, the high level sensor and indicator 31 may be a completely independent unit located in appropriate relationship to the level sensing means 12. Likewise timer 33 may be activated by a pressure signal developed by the in stream flow stoppage unit 32 or the high level sensor 31 and transmitted hydraulically or pneumatically rather than electrically as described.

Pulsator piston 40 has been described as being driven by a pneumatic arrangement (air cylinder 37 and distrbution valve 36), however, a hydraulic system using equivalent components peculiarly adapted for the handling of liquids rather than gases or a strictly mechanical system such as a piston driven by an accentric would function in the same manner. Although less desirable due to the quality of pulsations produced, opposite acting solenoids of appropriate capacity alternately energized directly by timer 33 can be coupled directly to piston 40 and produce very similar reciprocation of the piston.

What I claim is:

1. In a fluid mixture system having a container being supplied with a fluid mixture, a level sensing means for the container, a discharge line from the container, a variable throat restrictor valve in the discharge line for controlling the flow of fluid mixture from the container, and means responsive to the level sensing means to vary the throat opening of the restrictor valve thereby maintaining a controlled level of fluid mixture in the container, the combination of: means to selectively superpose variable constrictive and expansive pulsations on the restrictor valve throat.

2. The fluid mixture system according to claim 1 including an excessively high level sensing means for the container wherein said means to selectively superpose variable constrictive and expansive pulsations on the restrictor valve throat is activated responsive to said excessively high level sensing means when an excessively high level of fluid mixture in the container is sensed.

3. The fluid mixture system according to claim 1 including a flow sensing means in the discharge line from the container wherein said means to selectively superpose variable constrictive and expansive pulsations on the restrictor valve throat is activated responsive to said flow sensing means when a flow stoppage in the discharge line from the container is sensed.

4. The fluid mixture system according to claim 1 including an excessively high level sensing means for the container and a flow sensing means in the discharge line from the container wherein said means to selectively superpose variable constrictive and expansive pulsations on the restrictor valve throat is activated responsive to either said excessively high level sensing means when an excessively high level of fluid mixture in the container is sensed or to said flow sensing means when a flow stoppage in the discharge line from the container is sensed.

5. The fluid mixture system according to claim 1 wherein said means to selectively superpose variable constrictive and expansive pulsations on the restrictor valve throat comprises a timer means and means responsive to the timer means to develop selectively variable pressure pulsations in an hydraulic system controlling the throat opening of said restrictor valve.

6. The fluid mixture system according to claim 2 wherein said means to selectively superpose variable constrictive and expansive pulsations on the restrictor valve throat comprises a timer means and means responsive to the timer means to develop selectively variable pressure pulsations in an hydraulic system controlling the throat opening of said restrictor valve.

7. The fluid mixture system according to claim 3 wherein said means to selectively superpose variable constrictive and expansive pulsations on the restrictor valve throat comprises a timer means and means responsive to the timer means to develop selectively variable pressure pulsations in an hydraulic system controlling the throat opening of said restrictor valve.

8. The fluid mixture system according to claim 4 wherein said means to selectively superpose variable constrictive and expansive pulsations on the restrictor valve throat comprises a timer means and means responsive to the timer means to develop selectively variable pressure pulsations in an hydraulic system controlling the throat opening of said restrictor valve.

9. The fluid mixture system according to claim 5 wherein said means to develop selectively variable pressure pulsations comprises means to reciprocate a piston in response to the timer, and means to convert the piston reciprocations to pressure pulsations in the hydraulic system.

10. The fluid mixture system according to claim 6 wherein said means to develop selectively variable pressure pulsations comprises means to reciprocate a piston in response to the timer, and means to convert the piston reciprocations to pressure pulsations in the hydraulic system.

11. The fluid mixture system according to claim 7 wherein said means to develop selectively variable pressure pulsations comprises means to reciprocate a piston in response to the timer, and means to convert the piston reciprocations to pressure pulsations in the hydraulic system.

12. The fluid mixture system according to claim 8 wherein said means to develop selectively variable pressure pulsations comprises means to reciprocate a piston in response to the timer, and means to convert the piston reciprocations to pressure pulsations in the hydraulic system.

13. The fluid mixture system according to claim 9 wherein means is included to selectively vary the reciprocation of said piston in each direction between an at rest neutral position and a maximum extent of travel.

14. The fluid mixture system according to claim 10 wherein means is included to selectively vary the reciprocation of said piston in each direction between an at rest netural position and a maximum extent of travel.

15. The fluid mixture system according to claim 11 wherein means is included to selectively vary the reciprocation of said piston in each direction between an at rest neutral position and a maximum extent of travel.

16. The fluid mixture system according to claim 12 wherein means is included to selectively vary the reciprocation of said piston in each direction between an at rest neutral position and a maximum extent of travel.

References Cited

UNITED STATES PATENTS 2,470,744   5/1949   Korn.

CLARENCE R. GORDON, *Primary Examiner.*

U.S. Cl. X.R.

137—397; 138—46; 302—62